United States Patent
Tanaka (10) Patent No.: US 6,553,188 B2
(45) Date of Patent: Apr. 22, 2003

(54) CAMERA WITH IMPROVED OUTER COVERS

(75) Inventor: Yasuhiko Tanaka, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/971,633

(22) Filed: Oct. 9, 2001

(65) Prior Publication Data
US 2002/0041764 A1 Apr. 11, 2002

(30) Foreign Application Priority Data

Oct. 6, 2000 (JP) .................................... 2000-307441
Mar. 28, 2001 (JP) .................................... 2001-094263

(51) Int. Cl.$^7$ .............................................. G03B 17/02
(52) U.S. Cl. ...................................... 396/535; 396/541
(58) Field of Search ............................... 396/535, 540, 396/541, 6

(56) References Cited

U.S. PATENT DOCUMENTS 5,581,321 A * 12/1996 Boyd ........................ 396/535
5,697,005 A * 12/1997 Kikuchi .................... 396/535
5,708,898 A * 1/1998 Manabe et al. ............ 396/535
6,381,409 B1 * 4/2002 Aoshima et al. ........... 396/429

FOREIGN PATENT DOCUMENTS

JP    A 2000-89325    3/2000

OTHER PUBLICATIONS

Shibayam, Yoshinobu, Japanese Patent 2000–89325, Sep. 11, 1998. As translated by Derwent Information on Aug. 30, 2002.*

* cited by examiner

Primary Examiner—Alan A. Mathews
Assistant Examiner—Andrew Sever
(74) Attorney, Agent, or Firm—Young & Thompson

(57) ABSTRACT

A camera includes a main body. A casing is constituted by a rear cover and a front cover, for containing the main body. The rear and front covers are open in respectively forward and backward directions, and have first and second joining end faces positioned in respectively the forward and backward directions and opposed to one another. An extension portion is formed to project from the first joining end faces, received by an inside of the second joining end faces, for being overlapped on a peripheral wall portion of the front cover. First and second insertion holes are formed in respectively the extension portion and the peripheral wall portion. A connection pin is inserted in the first and second insertion holes, fixedly secured to the second insertion hole, for securing the rear cover to the front cover by retaining the extension portion on the peripheral wall portion.

27 Claims, 8 Drawing Sheets

CAMERA WITH IMPROVED OUTER COVERS

BACKGROUND OF THE INVENTION

1. Field of the Invention

The present invention relates to a camera with improved outer covers. More particularly, the present invention relates to a camera in which outer covers can be positioned with respect to one another in a simple structure.

2. Description Related to the Prior Art

A compact camera has a camera body which includes a main body and outer covers. The main body accommodates a shutter unit and the like for taking an exposure. The outer covers contain the main body. The outer covers consist of a front cover and a rear cover secured to the front and rear of the main body. Screw retention is used in the camera for coupling the front cover with the rear cover. In general, portions coupled by the screw retention are disposed on a lateral wall or a lower wall of the camera body, because, if screws should appear in an upper wall or front wall of the camera body, appearance of the camera would not be neat or agreeable. The lateral wall or lower wall is kept rigid and durable due to the coupling by the screw retention. However, the coupling is less strong in the upper wall of the camera body due to the lack of the screw retention. The front and rear covers have joining end faces opposed to one another. It is likely in the upper wall that the front and rear covers become offset up or down along the joining end faces. If the upper wall of the camera body is pushed down, a gap may occur as the joining end faces comes away from one another.

JP-A 2000-089325 discloses an example of the camera having a joining ridge disposed in one of the outer covers, formed on an inner line of the joining end faces. A remaining one of the outer covers is secured in a state with one of the joining end faces overlapped outside the joining ridge. This prevents the outer covers from being offset up or down in the upper wall of the camera body that does not have the screw retention. Even the front and rear covers are pushed downwards and receive force to move in directions away from one another, there is no offsetting between the front and rear covers at the overlapped portions. No opening occurs between those at the juncture.

One suggested modification is the front cover of metal and the rear cover of plastic material in combination with the structure of JP-A 2000-089325. The plastic material of the rear cover is to increase productivity and reduce the weight. The metal of the front cover is to provide agreeable appearance of the camera body. However, there is a problem in the one of the joining end faces at the front cover has a greater thickness than the remainder of the joining end faces at the rear cover because of overlapping on the joining ridge of the rear cover. Unevenness occurs in the height of the camera body in the upper wall between the front and rear covers. It is difficult in the front cover of metal to change the thickness only in the vicinity of the joining end faces due to problems in the manufacturing process and the strength. If the thickness of the rear cover around the joining end faces is set greater, the volume of the camera body may be increased. It is impossible to suppress the offsetting between the front and rear covers only by changing the thickness of the rear cover around the joining end faces.

A commercially available example of the camera is NEXIA 3200ixZ (trade name) produced by Fuji Photo Film Co., Ltd. According to this, a connection member is fixed between the rear cover and the main body. Connection pins are included in the piece of the connection member, and formed to protrude. Positioning holes are formed in the front cover. The connection pins are fitted in the positioning holes to position the front cover for fixation. Only end faces of the connection pins emerge externally in the surface of the front cover. This makes the appearance of the camera body better than that of the camera body with screws for retention.

However, numerous elements incorporated in the camera of a low cost are formed from plastic material such as ABS resin. The connection member is also plastic according to NEXIA 3200ixZ. If the connection pins included in the piece of the connection member appear externally through the positioning holes formed in the front cover of metal, good appearance of the front cover is influenced by the forms of the connection pins, to give poor impression to users or purchasers. The connection pins require a sufficient diameter for keeping high strength in coupling with the front cover. Thus, an area of the connection pins to lie externally is considerably large. The appearance becomes still poorer. The effects in the use of the front cover of metal become still smaller.

SUMMARY OF THE INVENTION

In view of the foregoing problems, an object of the present invention is to provide a camera in which the outer covers can be coupled without offsetting in the position at the joining end faces and without changing one of the outer covers formed from metal.

Another object of the present invention is to provide a camera in which one of the outer covers is formed from metal, and in which a retention element can have no inconsistent appearance to the metallic appearance and also can operate for reliable retention.

In order to achieve the above and other objects and advantages of this invention, a camera includes a main body. A casing is constituted by a rear cover and a front cover, for containing the main body. The rear and front covers are open in respectively forward and backward directions, and have first and second joining end faces positioned in respectively the forward and backward directions and opposed to one another. An extension portion is formed to project from one of the first and second joining end faces, received by an inside of a remaining one of the first and second joining end faces, for being overlapped on a peripheral wall portion of the rear or front cover. First and second insertion holes are formed in respectively the extension portion and the peripheral wall portion. A connection pin is inserted in the first and second insertion holes, fixedly secured to at least one thereof, for securing the rear cover to the front cover by retaining the extension portion on the peripheral wall portion.

In a preferred embodiment, the extension portion is disposed on the rear cover, and projects in the forward direction from the first joining end face.

The front cover is metallic.

The first and second joining end faces are disposed behind a center of the casing with respect to the forward or backward direction.

The connection pin includes a first pin end inserted in the first insertion hole. A second pin end is inserted in the second insertion hole, and secured thereto by caulking.

The extension portion is formed integrally with the rear cover.

The first insertion hole has a greater diameter than the second insertion hole. The first pin end has a greater diameter than the second pin end, and is prevented from dropping by the caulking of the second pin end.

Furthermore, a ridge is formed to project in the forward direction from the first joining end face along an inner edge thereof. A ridge receiving surface is formed to chamfer an inner edge of the second joining end face, and fitted on the ridge.

The ridge includes a first inclined surface inclined in the forward or backward direction. The ridge receiving surface is inclined in the forward or backward direction, and fitted on the first inclined surface.

In a further preferred embodiment, the connection pin includes a first pin end inserted in the first insertion hole in a forcible manner, and fixedly secured thereto. A second pin end is inserted in the second insertion hole.

The extension portion is constituted by a connection plate secured to the rear cover, and overlapped on the peripheral wall portion of the front cover.

The first pin end has a greater diameter than the second pin end. The second pin end is adapted for positioning the peripheral wall portion of the front cover.

The connection plate includes a first portion disposed between the peripheral wall portion of the rear cover and the main body. Furthermore, a retention mechanism secures the first portion to at least the rear cover.

The connection plate is plastic, and the connection pin is metallic.

The rear cover includes a rear wall and a first peripheral wall portion, the first peripheral wall portion being formed to project from a periphery of the rear wall, and having the first joining end face. The front cover includes a front wall and a second peripheral wall portion, the second peripheral wall portion being formed to project from a periphery of the front wall, and having the second joining end face.

According to another aspect of the invention, a camera includes a main body. A casing is constituted by a first cover and a second cover, for containing the main body. The first and second covers are open in respectively a first direction and a second direction reverse thereto, and have first and second joining end faces opposed to one another. A connection plate includes a first portion and an extension portion, the first portion being secured between the first cover and the main body, and the extension portion being overlapped on the second cover. First and second insertion holes are formed in respectively the extension portion and the second cover. A connection pin is inserted in the first and second insertion holes, fixedly secured to the first insertion hole, for securing the first cover to the second cover by retaining the extension portion on the second cover.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
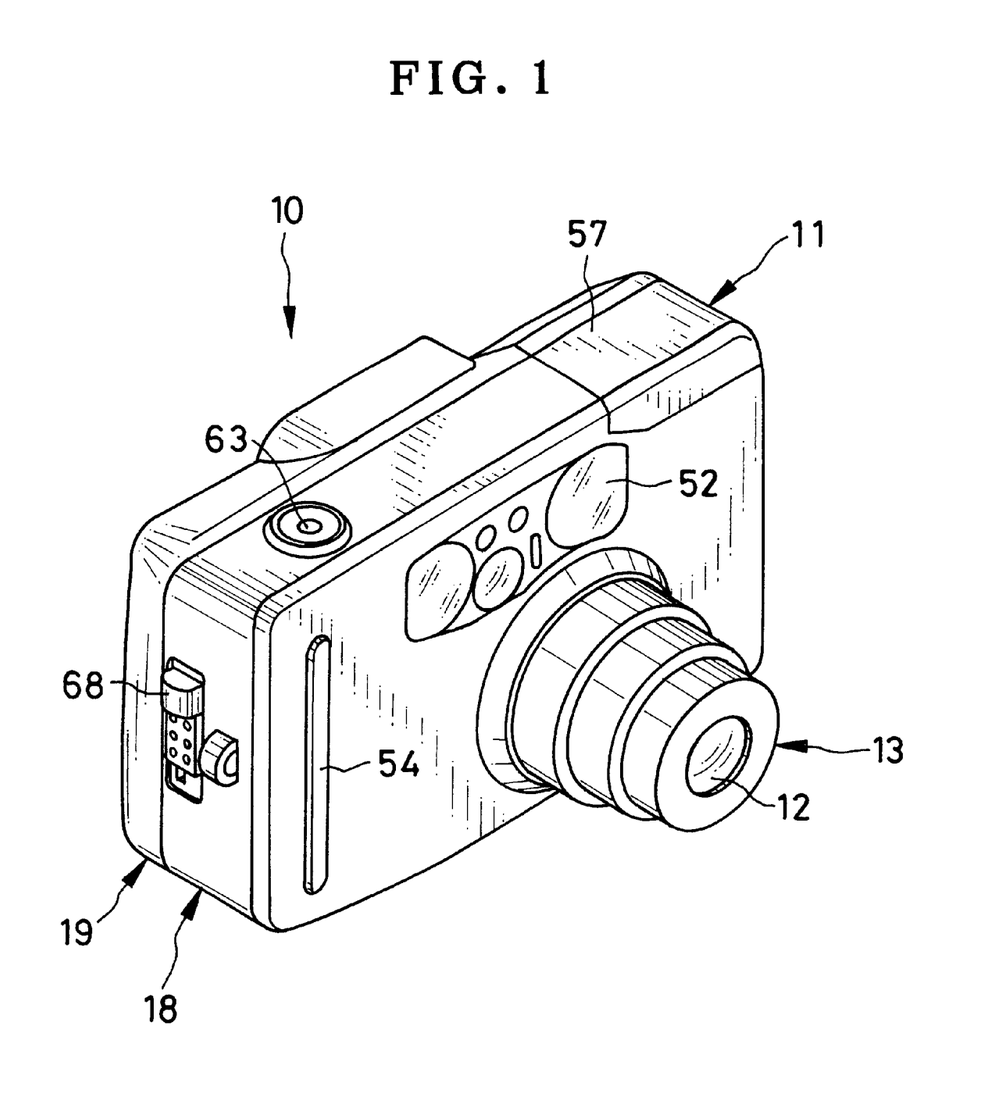
FIG. 1 is a perspective illustrating a camera of the invention.
Figure 2:
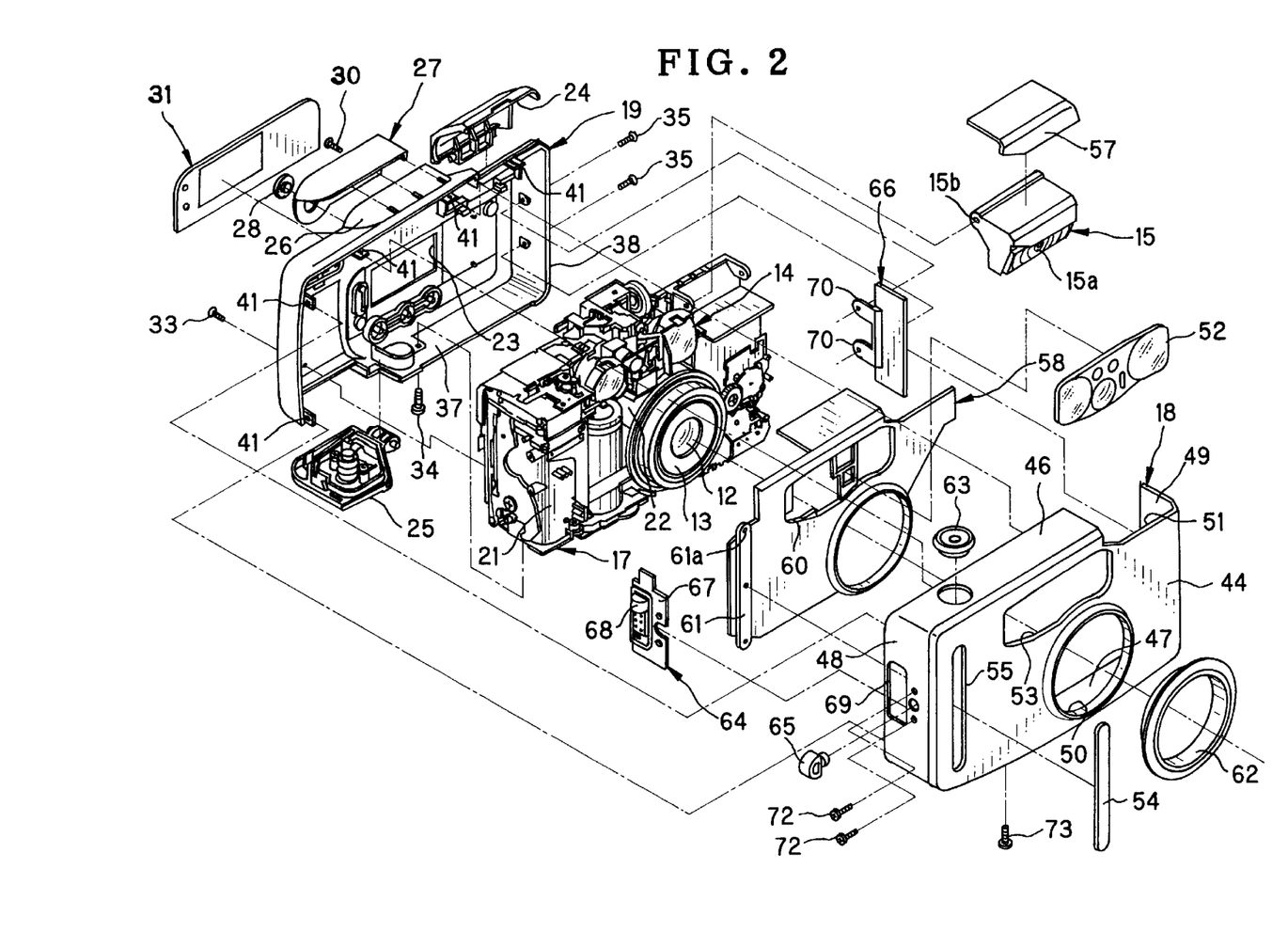
FIG. 2 is an exploded perspective illustrating the camera.

In FIGS. 1 and 2, a camera 10 is illustrated. A camera body 11 is constituted by a main body 17 and a casing. The casing includes a front cover 18 and a rear cover 19. The main body 17 includes a lens barrel 13, a viewfinder unit 14, a flash emitter 15, a shutter mechanism, a photo film feeding mechanism and the like. The lens barrel 13 accommodates a taking lens 12. The rear cover 19 is formed from plastic material in consideration of a light weight of the camera 10. The front cover 18 is formed by pressing aluminum alloy having appearance of high quality.

A cassette holder chamber 21 is formed in the main body 17 for being loaded with a photo film cassette. A photo film take-up chamber (not shown) in the main body 17 operates for taking up photo film drawn from the photo film cassette. A stationary barrel 22 is formed in the main body 17 for containing the lens barrel 13. The cassette holder chamber 21 and the take-up chamber are so disposed that the stationary barrel 22 lies between the two. An exposure aperture is defined by the rear of the stationary barrel 22, and determines a region in which the photo film is exposed.

The viewfinder unit 14 is disposed in a position over the stationary barrel 22. The flash emitter 15 is disposed in a position over the take-up chamber. The viewfinder unit 14 is a component including a zoom viewfinder unit, a rangefinding unit with light projector and light receiver, a photometric unit and the like. The zoom viewfinder unit changes magnification of the viewfinder in a manner corresponding to zooming of the taking lens 12. The flash emitter 15 includes a flash discharge tube, a reflector and a diffusion plate 15a that is disposed in front of those to operate also as transparent protector. A pivot 15b keeps the flash emitter 15 rotatable between open and closed positions. When the flash emitter 15 is in the open position, the diffusion plate 15a emerges externally. When the flash emitter 15 is in the closed position, the diffusion plate 15a is contained inside the main body 17.

An opening 23 is formed in the rear of the rear cover 19 for uncovering a liquid crystal display (LCD) panel disposed on the rear of the main body 17. Also, various openings are formed for positions of an eyepiece lens of a viewfinder, a power switch, a zooming switch and the like. A battery chamber lid 24 is disposed on an upper side of the rear cover 19 for removal of batteries. A cassette chamber lid 25 is disposed on a lower side of the rear cover 19 for removal of the photo film cassette inserted in the cassette holder chamber 21.

A protrusion portion 26 is formed at the top of the rear cover 19, and contains the viewfinder unit. Openings are formed in the rear wall of the protrusion portion 26. An eyepiece cover 27 is secured to and covers the protrusion portion 26.

An operation member 28 is secured to the eyepiece cover 27 for changing over a view field of the viewfinder. Also, a window opening is formed in the eyepiece cover 27 in a light path from the eyepiece lens. The eyepiece cover 27 is attached to the rear cover 19 by adhesive agent. Also, a screw 30 is fastened for firm attachment of the eyepiece cover 27. A transparent protector 31 of plastic material protects the LCD panel, and is attached to the rear cover 19 by adhesive agent.

The rear cover 19 is fixed to the main body 17 by retention of screws 33 and 34 and connection screws 35 on a rear side, a lower side and a left side as viewed from a user behind the camera 10. The rear and lower sides of the rear cover 19 are directly contacted by the outside of the main body 17.

Figure 3:
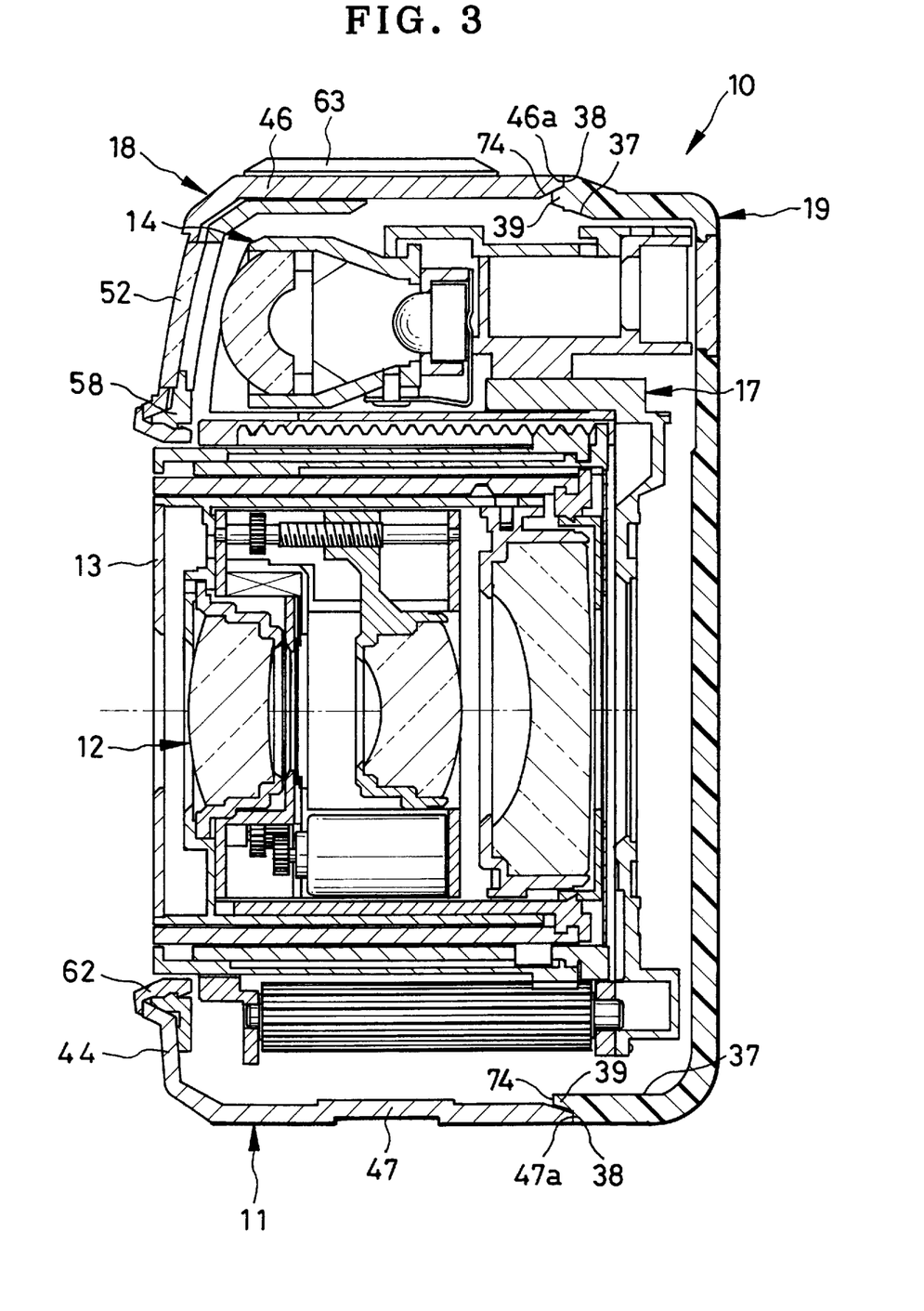
FIG. 3 is a cross section illustrating the camera.

As illustrated in detail in FIG. 3, a first peripheral wall portion 37 is included in the rear cover 19, located to extend on upper, lower, right and left sides, to define an inner space inside the rear cover 19. A front joining end face 38 is located on the first peripheral wall portion 37 and about the inner space, and adapted for joining with the front cover 18. A ridge 39 is formed to project from the front joining end face 38, and has a surface inclined toward the front from a base level of the front joining end face 38.

Figure 4:
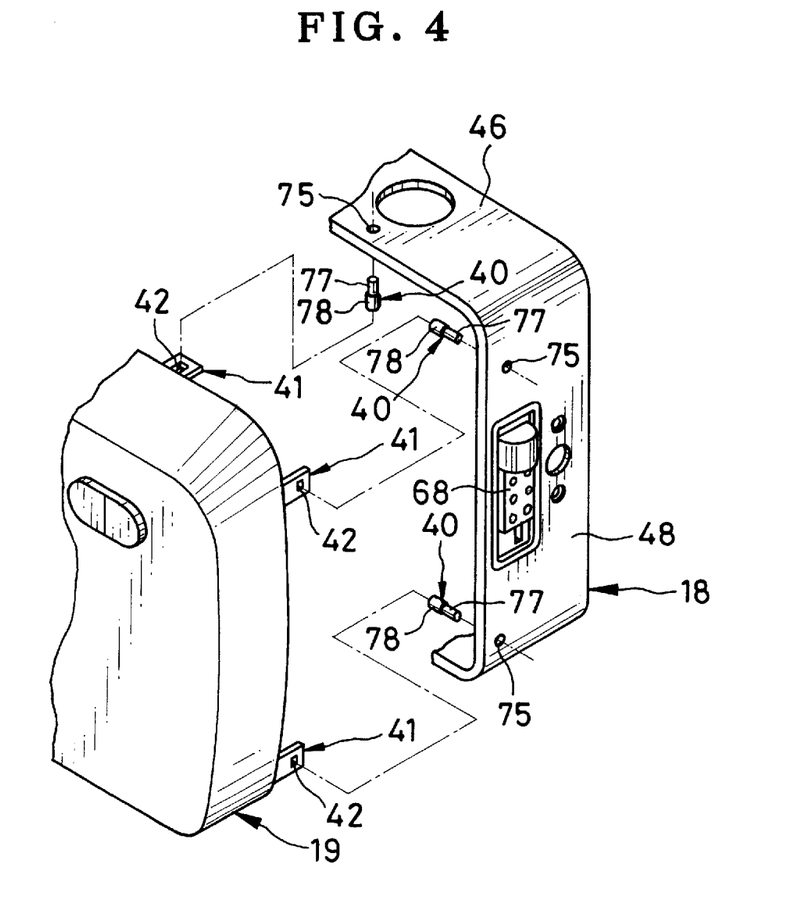
FIG. 4 is an exploded perspective, partially cut away, illustrating front and rear covers and relevant elements for fastening.

Extension portions 41 project from the first peripheral wall portion 37 of the rear cover 19 in several positions surrounding the main body 17. In FIG. 4, connection pins 40, which will be secured to the front cover 18, are inserted in insertion holes or recesses 42 formed in the extension portions 41, to combine and position the front cover 18 with the rear cover 19. The rear cover 19 is kept from dropping accidentally from the front cover 18.

Note that the insertion holes 42 are through holes according to the drawing, but may be recesses formed in the extension portions 41 and defined by a fork, a hook or the like.

A front wall 44 is included in the front cover 18, and covers the front of the main body 17. The front cover 18 includes an upper wall portion 46, a lower wall portion 47, a right lateral wall portion 48 and a left lateral wall portion 49, which constitute a second peripheral wall portion, and cover horizontal and vertical faces of the main body 17. The front wall 44 has a barrel opening 50, a recess 51, an opening 53 and a slot 55. The barrel opening 50 is adapted for moving the lens barrel 13 back and forth. The recess 51 is adapted for supporting the diffusion plate 15a of the flash emitter 15. In the opening 53, a viewfinder cover 52 is positioned. The slot 55 is adapted for positioning a grip plate 54.

The recess 51 is defined by a cut extending from the upper wall portion 46 to the front wall 44, and shaped to receive the flash emitter 15 in a fitted manner. A flash cover 57 is secured to a top of the flash emitter 15, and has a shape fitted in the recess 51. When the flash emitter 15 is in the closed position, the flash cover 57 keeps the top of the flash emitter 15 covered inside. The flash cover 57 is formed by pressing of aluminum alloy in the same manner as the rear cover 19.

The viewfinder cover 52 is formed from transparent plastic material, and covers an objective lens of the viewfinder, light projecting and light receiving elements of photometric and rangefinding units. A rear surface of the viewfinder cover 52 is provided with suitably shaped light-shielding opaque film attached thereto, to prevent the inner elements of the camera body 11 from being seen externally by covering portions other than the objective lens of the viewfinder and the light projecting and light receiving elements.

An intermediate plate 58 is secured to a rear surface of the front wall 44. An opening 60 is formed in the intermediate plate 58, and receives the viewfinder cover 52. An engaging ridge 61 is formed with the viewfinder cover 52, and fitted in the slot 55 in the front wall 44. After insertion of the viewfinder cover 52 in the opening 60, the intermediate plate 58 is secured to the front cover 18 by coating of adhesive agent, and by insertion of the engaging ridge 61 in the slot 55. The viewfinder cover 52, therefore, is secured to the front cover 18 in a position to emerge through the opening 53. A retention hole 61a is formed in the engaging ridge 61. A projection (not shown) is formed on a rear of the grip plate 54, is retained in the retention hole 61a, to fix the grip plate 54 to the front cover 18. At the time of taking an exposure, a user's right finger holds the grip plate 54 firmly to support the right portion of the camera body 11. Note that the grip plate 54 is formed by molding plastic material, but is coated with paint material which has appearance similar to metal plating, for the grip plate 54 to have similar appearance to that of the front cover 18.

A decorative ring 62 is secured to the edge of the barrel opening 50 of the front wall 44.

A shutter release button 63 is fitted on the upper wall portion 46. A lid opener 64 and a strap holder 65 are disposed on the right lateral wall portion 48. The lid opener 64 is operable for opening and closing the cassette chamber lid 25. The strap holder 65 is adapted for connecting a strap. A connection plate 66 is secured to the left lateral wall portion 49, and is connected with the rear cover 19 and the main body 17. The lid opener 64 includes a support plate 67 and a button 68 disposed on the support plate 67 in a slidable manner. The support plate 67 is attached to an inner face of the right lateral wall portion 48 by adhesive agent. An opening 69 is formed in the right lateral wall portion 48, and causes the button 68 to emerge externally. When the button 68 is slid vertically, the cassette chamber lid 25 becomes open. If the cassette holder chamber 21 is loaded with a photo film cassette being unused or partially used, the lid opener 64 is locked and kept from moving. The cassette chamber lid 25 cannot be open.

A projection (not shown) of the connection plate 66 is inserted in a hole formed in the left lateral wall portion 49. An end portion of the projection is heated and thermally deformed for fixation to the front cover 18. Insertion holes 70 are formed through the connection plate 66. The connection screws 35 are inserted in the insertion holes 70 to couple the connection plate 66 with the rear cover 19 and the left lateral side of the main body 17. In addition to the connection with the connection plate 66, screws are used to retain the front cover 18 on the main body 17. Through holes are formed in the right lateral wall portion 48 and the lower wall portion 47 for screw insertion. Screws 72 and 73 fasten the front cover 18 in keeping the main body 17 in direct contact with the right lateral wall portion 48 and the lower wall portion 47.

The upper wall portion 46 of the front cover 18 has a rear joining end face 46a. The lower wall portion 47 of the front cover 18 has a rear joining end face 47a. There is a ridge receiving surface or facet 74 formed by chamfering with an inclination at each of the rear joining end faces 46a and 47a as illustrated in FIG. 3. As is not shown, an inclined surface or facet is formed with each of rear joining end faces of the lateral wall portions 48 and 49. The rear joining end faces 46a and 47a have a smaller thickness than remaining portions of the upper and lower wall portions 46 and 47. The ridge receiving surface 74 with the inclination is so formed that a wall thickness of the upper and lower wall portions 46 and 47 increases in the forward direction from the rear joining end faces 46a and 47a. The ridge receiving surface 74 with the inclination is formed at the time of pressing of the front cover 18. The rear joining end faces 46a and 47a of the upper and lower wall portions 46 and 47 are opposed to the front joining end face 38 of the rear cover 19 as well as rear joining end faces of the lateral wall portions 48 and 49. Outer surfaces of the front cover 18 and 19 are suitably continuous even at the front joining end face 38. The front joining end face 38 is disposed behind a central line with respect to the back-to-front direction of the camera body 11. Therefore, the rear cover 19 has a smaller size than the front cover 18 in the back-to-front direction. Although the rear cover 19 is not metallic and has a smaller strength than the front cover 18, its smaller size is effective in preventing or reducing deformation when pressed externally.

Figure 5:
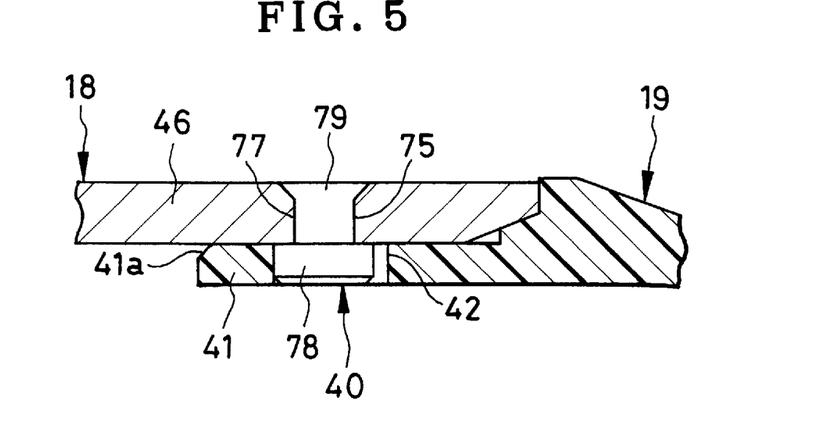
FIG. 5 is a section, partially cut away, illustrating an extension portion, an insertion hole and a connection pin.

In FIG. 4, insertion holes 75 are formed in the upper wall portion 46 and the right lateral wall portion 48, positioned at the extension portions 41 of the rear cover 19, and receive insertion of the connection pins 40. The connection pins 40 are formed from plastic material, and respectively include a pin end 77 and a retention pinhead 78. The pin end 77 has a small diameter that corresponds to the size of the insertion holes 75. The retention pinhead 78 is concentric with the pin end 77, has a greater diameter than the pin end 77, and is retained on an edge of the insertion holes 42 of the extension portions 41. In FIG. 5, a portion about each insertion hole 75 formed in the upper wall portion 46 is illustrated. As is not depicted in detail, the right lateral wall portion 48 has a similar structure to the upper wall portion 46 in relation to the insertion hole 75. In FIG. 5, the connection pin 40 is fixedly secured. For this, the pin end 77 is fitted in the insertion hole 75, and heated and pressurized by a hot tool to form a caulked pin end 79, which keeps the front cover 18 retained. The coupling of the front cover 18 and the rear cover 19 can be kept firmer by retention with the connection pin 40, to prevent a gap from occurring between those. A facet 41a is formed on an upper portion of each extension portion 41, and facilitates entry of the extension portion 41 into the front cover 18.

The operation of the above construction is described now. In an assembling process of the camera 10, the main body 17 is obtained by assembling the lens barrel 13, the viewfinder unit 14, the flash emitter 15, flexible circuit boards, a liquid crystal display panel and the like.

Various elements are assembled on to the front cover 18, including the decorative ring 62, the viewfinder cover 52, the intermediate plate 58, the grip plate 54, the lid opener 64, the connection plate 66 and the like. Also, elements are assembled on to the rear cover 19, including the eyepiece cover 27, the LCD panel, the transparent protector 31, the connection pins 40 and various switches. Note the caulked pin end 79 has not been formed yet. The connection pins 40 are only in a state where the pin end 77 is fitted in each of the insertion holes 75. After this, next process is to assemble the front cover 18, the rear cover 19 and the main body 17 with the various elements. The front cover 18 is fitted to the front of the main body 17 while the lens barrel 13 is inserted into the barrel opening 50. The rear cover 19 is fitted to the rear of the main body 17 while portions of the rear cover 19 outside the ridge 39 are fitted to the upper and lower wall portions 46 and 47 and the lateral wall portions 48 and 49 of the front cover 18. The ridge receiving surface 74 with the inclination is fitted on the ridge 39 with the inclined surface. At the same time, the retention pinhead 78 of the connection pins 40 is placed in each insertion hole 42.

With the front and rear covers 18 and 19 fitted on the main body 17, the screws 33 and 34 are fastened to fix the rear cover 19 to the main body 17. The screws 72 and 73 are fastened to fix the front cover 18 to the main body 17. Then the connection screws 35 are inserted into the rear cover 19 and the connection plate 66, so the front and rear covers 18 and 19 are secured to the main body 17 by screw fastening. Furthermore, the connection pins 40 are deformed with heat to form the caulked pin end 79, to fix the connection pins 40 to the front cover 18. Therefore, the fixation between the front and rear covers 18 and 19 can be considerably strong.

As has been described heretofore, the ridge receiving surfaces 74 or facets are formed with the rear joining end faces 46a and 47a of the upper and lower wall portions 46 and 47 and those of the lateral wall portions 48 and 49. Distal rear portions of the upper and lower wall portions 46 and 47 and the lateral wall portions 48 and 49 have a very small thickness, and do not protrude toward the outside of the front joining end face 38. There occurs no problem of offsetting between the front and rear covers 18 and 19 at the front joining end face 38, so that the casing constituted by the front and rear covers 18 and 19 can have a smoothly continuing surface. Portions of the front and rear covers 18 and 19 have a sufficient thickness except for the inclined surfaces or facets, and do not reduce the strength of the front cover 18.

In the above embodiment, the connection pins 40 are pins of plastic material. Alternatively, pins of metal may be used for connection between the front and rear covers 18 and 19. The pins may be fitted in the insertion holes 75 and may be attached by use of adhesive agent or the like. In the above embodiment, the connection pins 40 are fastened to the front cover 18 after fitting the front and rear covers 18 and 19 on the main body 17. Alternatively, the connection pins 40 may be previously secured to the front cover 18. To couple the front cover 18 with the rear cover 19, the extension portions 41 may be deformed resiliently to retain the connection pins 40 in the insertion holes 42.

In the above embodiment, the line between the front and rear covers 18 and 19 is slightly behind the center line of the casing. However, a line between the front and rear covers 18 and 19 may be located on, or close to, a rear face of the casing. The upper wall portion 46, the lower wall portion 47, and the lateral wall portions 48 and 49 of the front cover 18 may extend to the rear face of the casing.

Furthermore, a line between the front and rear covers 18 and 19 may be located on, or close to, a front face of the casing. The first peripheral wall portion of the rear cover 19 may extend to the front face of the casing.

Another preferred camera is described with reference to FIGS. 6–9, in which a front cover can be positioned with a rear cover even in a simple structure. A camera body 111 accommodates a lens barrel 113, in which a taking lens 112 is supported and an electronic shutter is disposed. There is a power switch (not shown) disposed in the rear. When the power switch is turned on, the lens barrel 113 protrudes to the front of the camera body 111. When the power switch is turned off, the lens barrel 113 is collapsed to the inside of the camera body 111.

Figure 6:
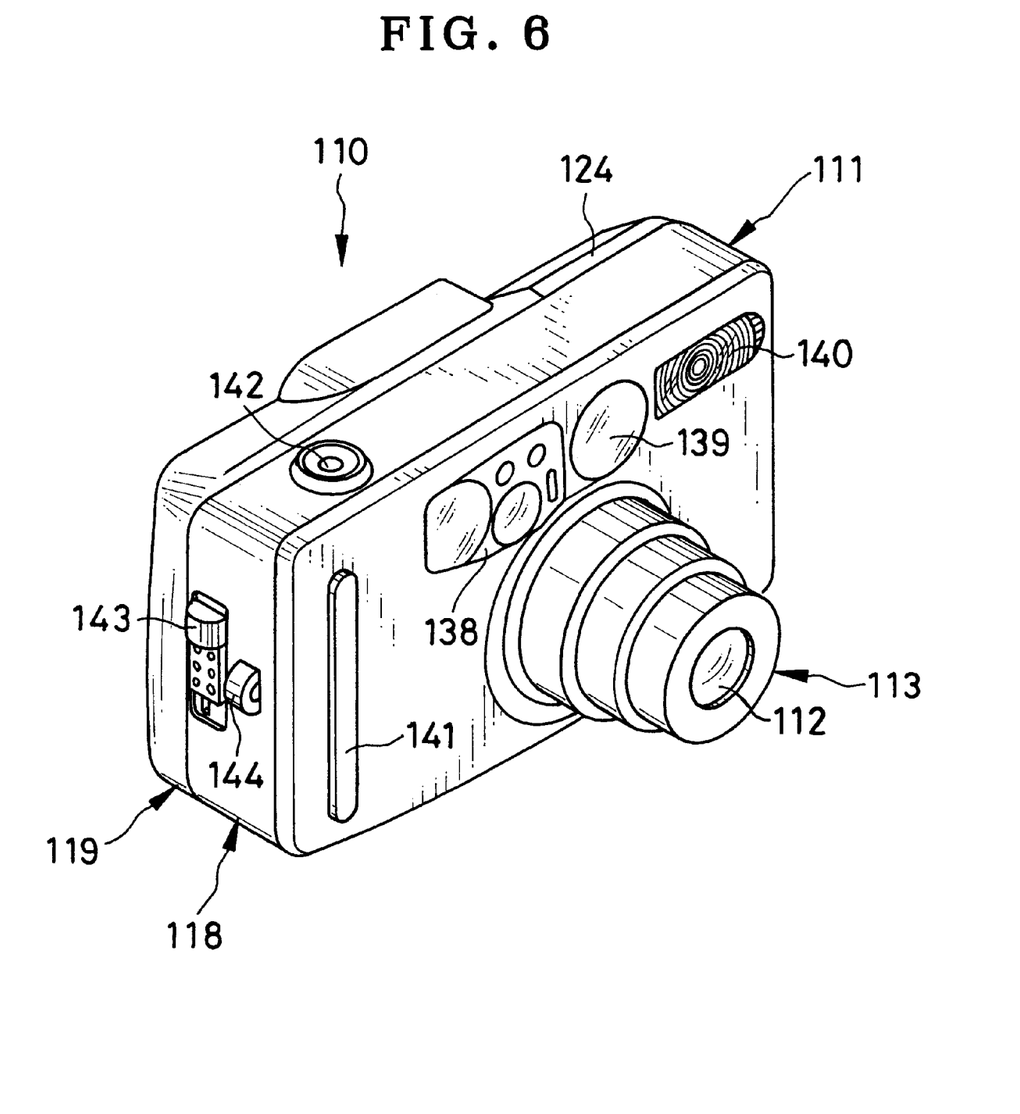
FIG. 6 is a perspective illustrating another preferred camera in which a front cover can be positioned with a rear cover in a simple structure.

A flash emitter has a construction of a zoom flash device, and is movable in the optical axis direction in a camera 110 with the lens barrel 113 to change an illuminating region of a photographic object.

Figure 7:
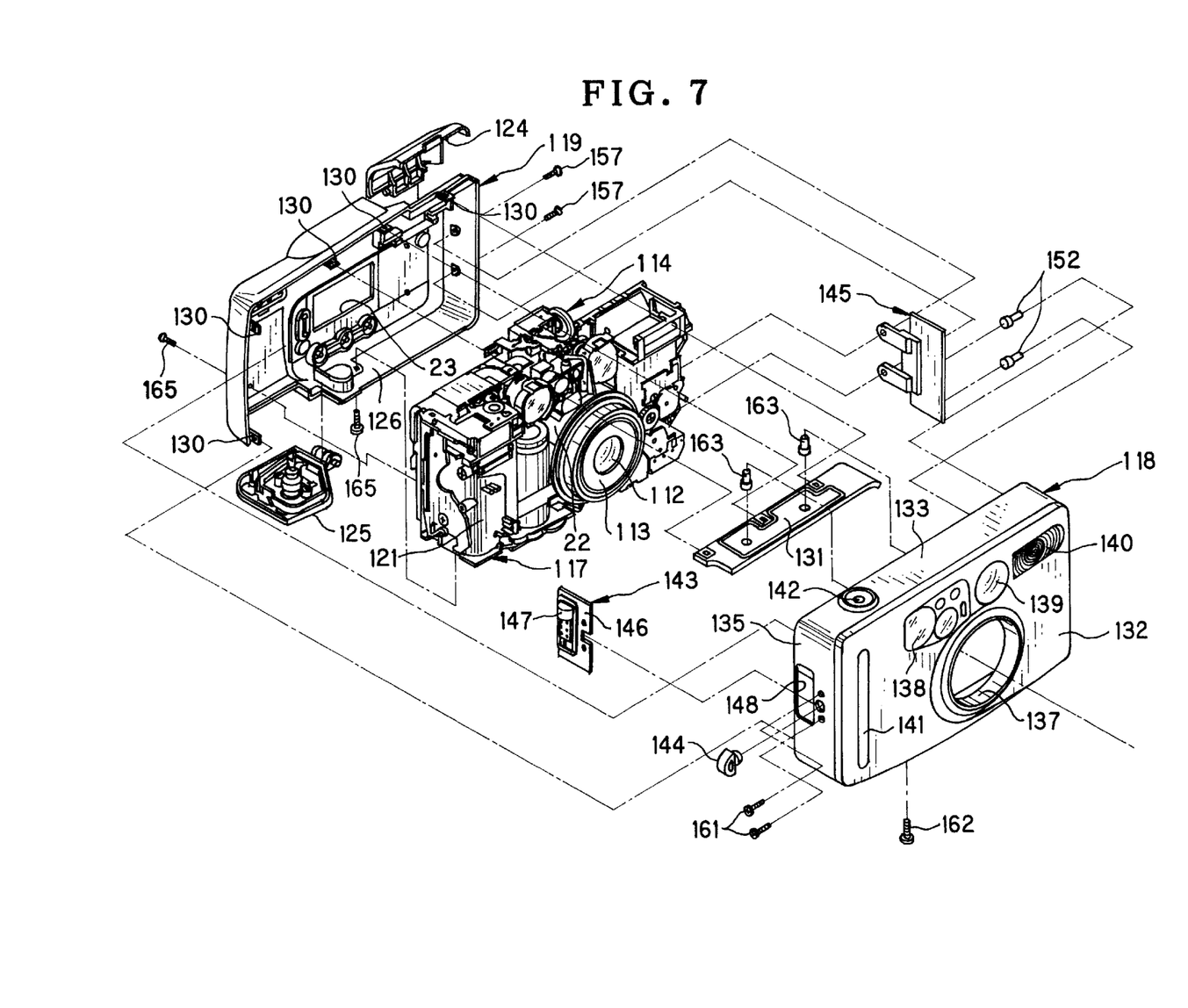
FIG. 7 is an exploded perspective illustrating the camera.
Figure 8:
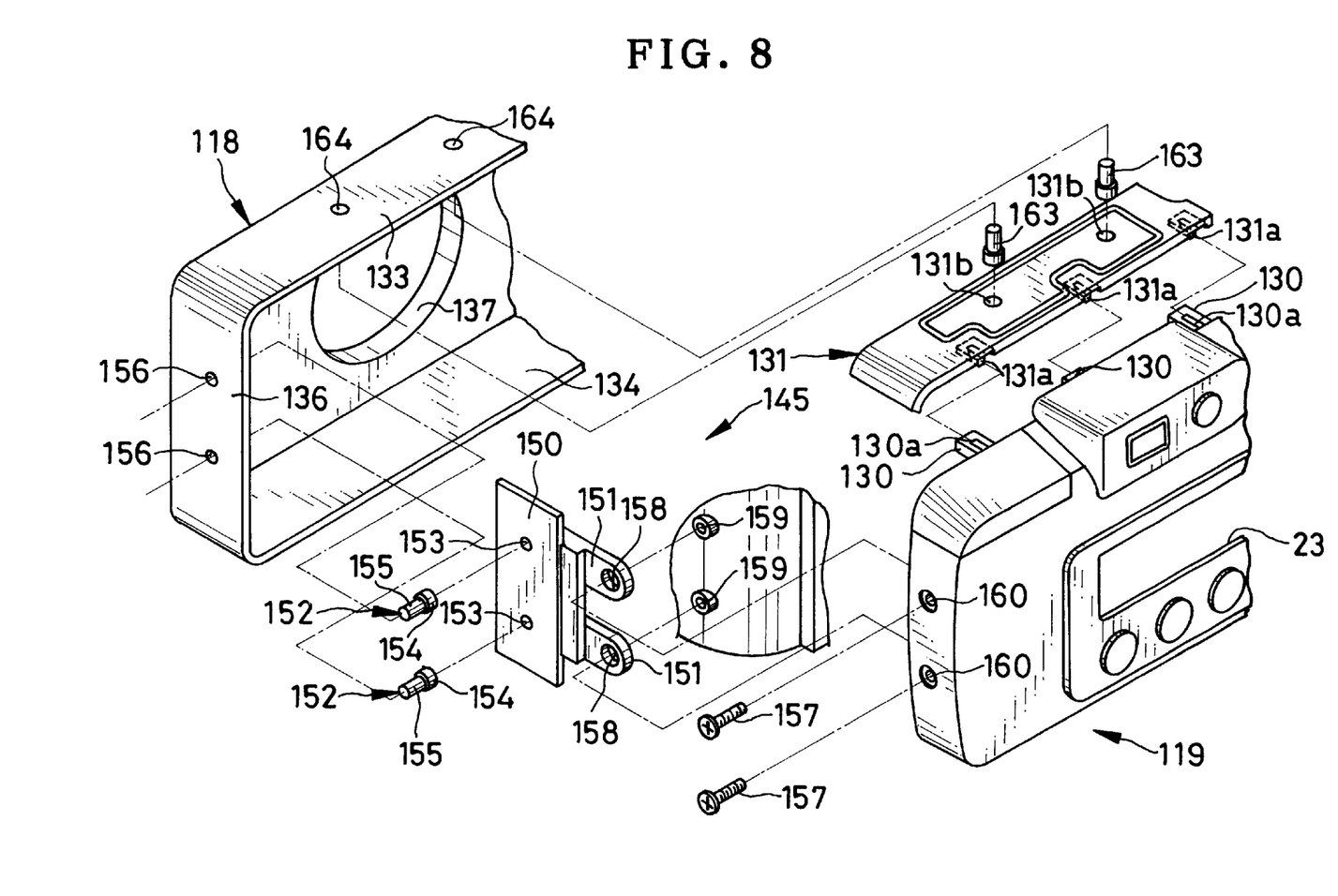
FIG. 8 is an exploded perspective, partially cut away, illustrating front and rear covers and relevant elements for fastening.

A rear cover 119 constituting the casing is disposed behind a main body 117, and has a first peripheral wall portion 126 within which a rear part of the main body 117 is located. Extension portions 130 are formed to protrude from several positions of the first peripheral wall portion 126. A front cover 118 is provided with a connection plate 131. In FIG. 8, a retention claw 131*a* protrudes from the connection plate 131. A retention hole 130*a* is formed in the extension portions 130, and receives the connection plate 131 for retention of the connection plate 131. This is for positioning of the rear cover 119 to the front cover 118.

The front cover 118 includes a front wall 132 for covering the front of the main body 117. There are an upper wall portion 133, a lower wall portion 134, a right lateral wall portion 135 and a left lateral wall portion 136, which constitute a second peripheral wall portion, and cover horizontal and lateral faces of the main body 117. An opening is formed in the front wall 132 for receiving the lens barrel 113 movably back and forth. A decorative ring 137 is fitted to an edge of the opening. There are cover plates 138 and 139, a flash emission window panel 140 and a grip plate 141 disposed on the front wall 132. A viewfinder unit 114 has an eyepiece lens and an objective lens, which is covered by the cover plate 139. The cover plate 138 covers the front of a photometric element and the like. The cover plates 138 and 139 protects those elements from dust or shock.

A shutter release button 142 is fitted on the upper wall portion 133. A lid opener 143 and a strap holder 144 is disposed on the right lateral wall portion 135. The lid opener 143 is operable for opening and closing a cassette chamber lid 125. The strap holder 144 is adapted for connecting a strap. A connection plate 145 is secured to the left lateral wall portion 136, and is connected with the rear cover 119 and the main body 117. The lid opener 143 includes a support plate 146 and a button 147 disposed on the support plate 146 in a slidable manner. The support plate 146 is attached to an inner face of the right lateral wall portion 135 by adhesive agent. An opening 148 is formed in the right lateral wall portion 135, and causes the button 147 to emerge externally. When the button 147 is slid vertically, the cassette chamber lid 125 becomes open.

Figure 9:
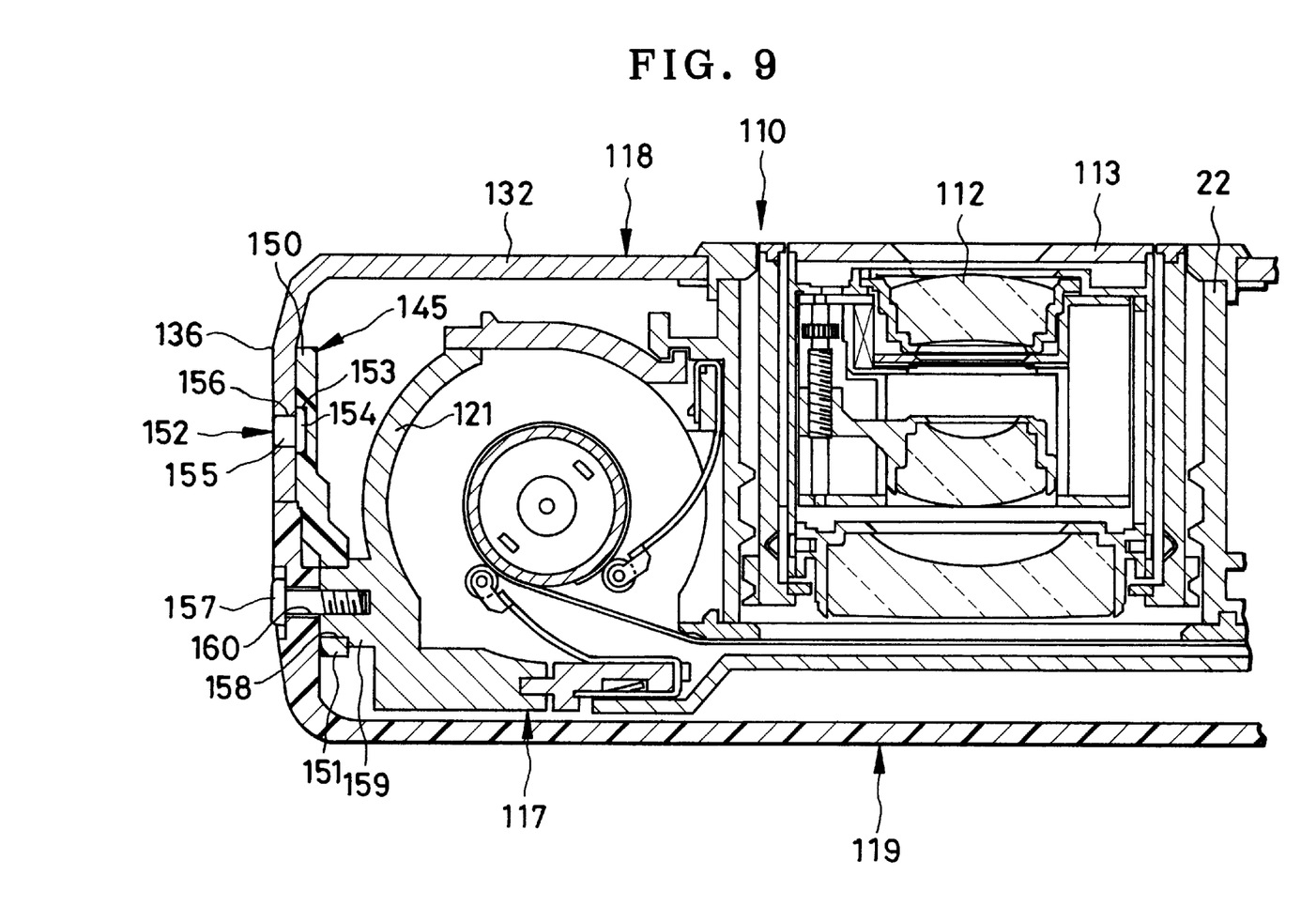
FIG. 9 is a horizontal section, partially cut away, illustrating the camera with elements in FIG. 8.

In FIGS. 8 and 9, the connection plate 145 includes a first portion 151 and an extension portion 150. The first portion 151 is squeezed between the main body 117 and the rear cover 119. The extension portion 150 is secured to the front cover 118. Insertion holes 153 are formed in the extension portion 150. Connection pins 152 are fitted in the insertion holes 153 forcibly in a tight state. The connection pins 152 are formed from metal, and respectively include a pinhead 154 and a pin end 155. The pinhead 154 has a greater diameter than the pin end 155. The pinhead 154 is tightly fitted in the insertion holes 153 of the connection plate 145. Insertion holes 156 are formed in the left lateral wall portion 136 of the front cover 118, and receive insertion of the pin end 155 of the connection pins 152.

Receiving holes 158 are formed in the first portion 151. Connection screws 157 are positioned in the receiving holes 158. Bosses 159 are formed to project from a wall of a photo film take-up chamber 121, and are inserted in respectively the receiving holes 158. Screw holes 160 are formed in the rear cover 119. While the bosses 159 are fitted in the receiving holes 158, the connection screws 157 are inserted in the screw holes 160, and fastened to retain the rear cover 119 to the main body 117. Therefore, the connection plate 145 is secured fixedly between the rear cover 119 and the main body 117. Thus, the connection plate 145 is kept fixed by screw retention between the rear cover 119 and the main body 117. The connection pins 152 are fitted into the insertion holes 156 formed in the left lateral wall portion 136 in the front cover 118. This is effective in positioning the left lateral wall portion 136 of the front cover 118 on the rear cover 119 and the main body 117. Note that, although the insertion holes 156 in the front cover 118 are through holes formed in the left lateral wall portion 136, the insertion holes 153 in the connection plate 145 do not come through the extension portion 150, but are recesses with a depth according to a size of the pinhead 154. The pin end 155 protrudes from the surface of the extension portion 150 toward the left lateral wall portion 136 when the connection pins 152 are pressed into the connection plate 145.

In addition to the use of the connection plate 145, the front cover 118 is retained on the rear cover 119 or the main body 117 by means of screws 161 and 162 and the connection plate 131. Through holes are formed in the right lateral wall portion 135 and the lower wall portion 134 of the front cover 118 for retention. The screws 161 and 162 fasten the right lateral wall portion 135 and the lower wall portion 134 to the main body 117 in a directly contacted state. Insertion holes 164 are formed in the upper wall portion 133. Connection pins 163 are forcibly inserted in the insertion holes 164, and are kept fitted firmly in those. The connection pins 163 have a first end fitted in each of the insertion holes 164. Insertion holes 131*b* are formed in the connection plate 131. A second end of the connection pins 163 is tightly fitted in the insertion holes 131*b*. This couples the connection plate 131 with the front cover 118. The right lateral wall portion 135 of the front cover 118 is coupled with the rear cover 119 by retention of the retention claw 131*a* of the connection plate 131 on the retention hole 130*a*. Note that the connection pins 163 have an identical shape to that of the connection pins 152. Operation is also the same. Furthermore, screws 165 fasten the rear cover 119 to the main body 117 in plurality of positions in addition to the connection screws 157.

In operation, elements are assembled on to the front cover 118, including the connection plate 131, the decorative ring 137, the cover plates 138 and 139, the flash emission window panel 140, the grip plate 141, the lid opener 143 and the strap holder 144. Also, a battery chamber lid 124, the cassette chamber lid 125 and various switches are assembled on to the rear cover 119. In the connection plate 145, the connection pins 152 have been fitted into the insertion holes 153. Setting of the connection pins 152 into the insertion holes 153 is according to the following processes. At first, a surface of the connection plate 145 with the insertion holes 153 is directed upwards. The pinhead 154 is positioned at each of insertion holes 153. Then the connection pins 152 are thrust into the insertion holes 153 toward the bottom of the insertion holes 153.

Then the bosses 159 are fitted in the receiving holes 158. The main body 117 is placed inside the first peripheral wall portion 126 of the rear cover 119. The first portion 151 is inserted between the rear cover 119 and the main body 117. The screw holes 160 are positioned at the bosses 159, before the connection screws 157 are fastened. The first portion 151 is squeezed between the rear cover 119 and the main body 117 to fix the connection plate 145. Also, the screws 165 are fastened to retain the rear cover 119 to the main body 117.

After mounting the rear cover 119, at first the retention claw 131*a* is retained in the retention hole 130*a*, to position the upper wall portion 133 of the front cover 118. The connection plate 145 is flexed in a direction toward the main body 117 while the front cover 118 is being joined to the rear cover 119. The pin end 155 of the connection pins 152 is set in each position of the insertion holes 156 formed in the left lateral wall portion 136. Pressing of the left lateral wall portion 136 toward the main body 117 fits the connection pins 152 into the insertion holes 156, suitably to position the left lateral wall portion 136 of the front cover 118. Therefore, the front cover 118 is positioned with exactness in the vertical and horizontal directions. The screws 161 and 162 are finally fastened helically, to terminate assembly of the front cover 118. As described heretofore, the connection pins 152 of metal are fitted in the front cover 118 of metal. It is possible that the connection pins 152 have a small size and a small diameter than that which a pin of resin would have. The connection pins 152 can have no conspicuous appearance in the surface of the front cover 118, and will not influence neat appearance of the camera 110. As the parts of metal are joined to one another, no retention of screws or adhesion is required. The left lateral wall portion 136 of the front cover 118 can be reliably secured to the rear cover 119 and the main body 117 by means of the connection plate 145.

Note that the upper wall portion 133, the lower wall portion 134, and the lateral wall portions 135 and 136 of the front cover 118 may extend to the rear face of the casing. The first portion 151 may be squeezed between the rear wall portion of the rear cover 119 and the main body.

Furthermore, a first peripheral wall portion of the rear cover 119 may extend to the front face of the casing.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera including:
   a main body; and
   a casing, constituted by a rear cover open in a forward direction and a front cover open in a backward direction, for containing said main body;
   wherein said rear and front covers have first and second joining end faces opposed to one another, said camera comprising:
   an extension portion, formed to project from one of said first and second joining end faces, received by an inside of a remaining one of said first and second joining end faces, for being overlapped on a peripheral wall portion of said rear or front cover;
   first and second insertion holes formed in respectively said extension portion and said peripheral wall portion; and
   a connection pin comprising a head and a non-threaded shaft, the connection pin being inserted in said first and second insertion holes, fixedly secured to at least one thereof, for securing said rear cover to said front cover by retaining said extension portion on said peripheral wall portion, wherein the head of the connection pin is disposed on an inside of the casing.

2. A camera as defined in claim 1, wherein said extension portion projects in said forward direction from said first joining end face.

3. A camera as defined in claim 2, wherein said front cover is metallic.

4. A camera as defined in claim 2, wherein said first and second joining end faces are disposed behind a center of said casing with respect to said forward or backward direction.

5. A camera as defined in claim 2, further comprising:
   a ridge formed to project in said forward direction from said first joining end face along an inner edge thereof;
   a ridge receiving surface formed to chamfer an inner edge of said second joining end face, and fitted on said ridge.

6. A camera as defined in claim 5, wherein said ridge includes a first inclined surface inclined in said forward or backward direction;
   said ridge receiving surface is inclined in said forward or backward direction, and fitted on said first inclined surface.

7. A camera as defined in claim 2, wherein said connection pin includes:
   a first pin end inserted in said first insertion hole in a forcible manner, and fixedly secured thereto; and
   a second pin end inserted in said second insertion hole.

8. A camera as defined in claim 7, wherein said extension portion is constituted by a connection plate secured to said rear cover, overlapped on said peripheral wall portion of said front cover.

9. A camera as defined in claim 8, wherein said first pin end is the head, the second pin end is the shaft, and the first pin end has a greater diameter than said second pin end;
   said second pin end is adapted for positioning said peripheral wall portion of said front cover.

10. A camera as defined in claim 9, wherein said connection plate includes a first portion disposed between said peripheral wall portion of said rear cover and said main body;
   further comprising a retention mechanism for securing said first portion to at least said rear cover.

11. A camera as defined in claim 10, wherein said connection plate is plastic, and said connection pin is metallic.

12. A camera as defined in claim 2, wherein said rear cover includes a rear wall and a first peripheral wall portion, said first peripheral wall portion being formed to project from a periphery of said rear wall, and having said first joining end face;
   said front cover includes a front wall and a second peripheral wall portion, said second peripheral wall portion being formed to project from a periphery of said front wall, and having said second joining end face.

13. The camera of claim 1, wherein the head of the connection pin is fixedly secured to the second cover, and a face of the head nearest the shaft is in contact with an interior face of the peripheral wall portion.

14. A camera including:
   a main body; and
   a casing, constituted by a rear cover open in a forward direction and a front cover open in a backward direction, for containing said main body;
   wherein said rear and front covers have first and second joining end faces opposed to one another, said camera comprising:
   an extension portion, formed to project from one of said first and second joining end faces, received by an inside of a remaining one of said first and second joining end faces, for being overlapped on a peripheral wall portion of said rear or front cover;
   first and second insertion holes formed in respectively said extension portion and said peripheral wall portion; and
   a connection pin, inserted in said first and second insertion holes, fixedly secured to at least one thereof, for securing said rear cover to said front cover by retaining said extension portion on said peripheral wall portion, wherein said connection pin includes:
   a first pin end inserted in said first insertion hole; and
   a second pin end inserted in said second insertion hole, and secured thereto by caulking;
   wherein said extension portion projects in said forward direction from said first joining end face.

15. A camera as defined in claim 14, wherein said extension portion is formed integrally with said rear cover.

16. A camera as defined in claim 15, wherein said first insertion hole has a greater diameter than said second insertion hole;
   said first pin end has a greater diameter than said second pin end, and is prevented from dropping by said caulking of said second pin end.

17. A camera including:
   a main body; and
   a casing, constituted by a rear cover open in a forward direction and a front cover open in a backward direction, for containing said main body;
   wherein said rear and front covers have first and second joining end faces opposed to one another, said camera comprising:
      a ridge formed to project in said forward direction from said first joining end face along an inner edge thereof; and
      a ridge receiving surface formed to chamfer an inner edge of said second joining end face, and fitted on said ridge;
      wherein the first and second end faces are in contact with one another along the ridge and the ridge receiving surface, and also along outer faces disposed outside of and immediately adjacent to the ridge and the ridge receiving surface, and arranged at an oblique angle to the ridge and the ridge receiving surface.

18. A camera as defined in claim 17, wherein said ridge includes a first inclined surface inclined in said forward or backward direction;
   said ridge receiving surface is inclined in said forward or backward direction, and fitted on said first inclined surface.

19. A camera as defined in claim 18, wherein said front cover is metallic.

20. A camera as defined in claim 19, wherein said rear cover includes a rear wall and a first peripheral wall portion, said first peripheral wall portion being formed to project from a periphery of said rear wall, and having said first joining end face;
   said front cover includes a front wall and a second peripheral wall portion, said second peripheral wall portion being formed to project from a periphery of said front wall, and having said second joining end face.

21. A camera as defined in claim 17, wherein said first and second joining end faces are disposed behind a center of said casing with respect to said forward or backward direction.

22. A camera including:
   a main body; and
   a casing, constituted by a first cover and a second cover, for containing said main body, each of said first and second cover having a box shape with one open side;
   said camera comprising:
      first and second joining end faces defined by said first and second covers, and opposed to one another;
      a connection plate, including a first portion and an extension portion, said first portion being secured between said first cover and said main body, and said extension portion being overlapped on said second cover;
      first and second insertion holes formed in respectively said extension portion and said second cover; and
      a connection pin comprising a head and a non-threaded shaft, the head being fixedly secured to said first insertion hole, the shaft being inserted in said second insertion hole, for securing said first cover to said second cover by retaining said extension portion on said second cover, wherein the head of the connection pin is disposed on an inside of the casing.

23. A camera as defined in claim 22, wherein said second cover is metallic.

24. A camera as defined in claim 23, wherein said first cover includes a rear wall and a first peripheral wall portion, said first peripheral wall portion being formed to project from a periphery of said rear wall, and having said first joining end face;
   said second cover includes a front wall and a second peripheral wall portion, said second peripheral wall portion being formed to project from a periphery of said front wall, and having said second joining end face;
   said first portion is secured between said first peripheral wall portion and said main body, and said extension portion is opposed to an inside of said second peripheral wall portion.

25. A camera as defined in claim 24, wherein said connection plate is plastic, and said connection pin is metallic.

26. A camera as defined in claim 24, wherein said first and second covers are respectively a rear cover and a front cover for covering rear and front portions of said main body.

27. The camera of claim 22, wherein the shaft of the connection pin is fixedly secured to an outward face of the connection plate, and a face of the head nearest the shaft directly faces an interior face of the second cover.

* * * * *